United States Patent [19]

Berger

[11] 4,022,923
[45] May 10, 1977

[54] FROZEN GARLIC AND METHOD OF PRODUCING THE SAME

[76] Inventor: Sonja Berger, 328 Claymore Blvd., Richmond Heights, Ohio 44143

[22] Filed: Aug. 7, 1975

[21] Appl. No.: 602,585

[52] U.S. Cl. .............................. 426/638; 426/651; 426/662; 426/524
[51] Int. Cl.² .......................................... A23L 1/22
[58] Field of Search .......... 426/638, 650, 651, 662, 426/524

[56] References Cited

UNITED STATES PATENTS

| 3,424,593 | 1/1969 | Bockman et al. ............. 426/650 X |
| 3,906,116 | 9/1975 | Quesnel et al. ................ 426/651 X |

FOREIGN PATENTS OR APPLICATIONS

| 1,196,562 | 2/1961 | France ............................... 426/638 |

*Primary Examiner*—R. B. Penland

[57] ABSTRACT

A method of processing garlic to form a composition of matter effected by a stable emulsion for the retention of flavor thereof and to permit freezing of the same.

7 Claims, No Drawings

FROZEN GARLIC AND METHOD OF PRODUCING THE SAME

My invention relates to an improved composition and to an improved method of freezing garlic and to preserve the fresh flavor thereof.

Heretofore it has not been possible to preserve the fresh flavor of garlic in storage.

Many attempts have been made to store garlic or substitutes therefor in dry form such as garlic salts, powders, etc. for later use. These products, however, have not acted as an adequate substitution for the use of fresh garlic.

It is an object of my invention therefore to produce a method of freezing garlic and to retain the fresh flavor thereof.

It is a further object of my invention to stabilize the volatile oil in the garlic.

A further object of my invention is to produce a natural product avoiding any use of preservatives or the like.

A still further object is to form a stable emulsion of the garlic pulp to assist in the freezing of said pulp.

Another object of my invention is to preserve the beneficial qualities of the garlic.

Another object of my invention is to freeze garlic in such form as will be adapted to be dispensed when desired in measured, easily available quantities.

Other objects of my invention and the invention itself will become more readily apparent by reference to the following description thereof.

To freeze garlic, I have discovered that it is preferable to first mash, crush or otherwise comminute or fractionate fresh garlic cloves and it is essential to add an emulsifier to such particles or pulp. I have found it may be beneficial to add a small amount of water to the particles. I have found by experimentation that lecithin is an effective emulsifier for this purpose. It is a natural phosphorus-containing water soluble liquid and forms with the garlic a stable emulsion which stabilizes the volatile oil in the crushed allium or garlic and creates a homogeneous natural substance which assists in the freezing of the garlic particles and which, when frozen or dissolved for use at a later date, enables the garlic to retain its fresh flavor.

Lecithin, which is a soy derivative, apart from its use as a natural emulsifier, does not have a flavor which would diminish the garlic flavor and its addition as an emulsifier enables the garlic pulp to be frozen in small, measured, easily dissolved, easily used portions having a natural garlic flavor. The use of said emulsifier will not affect the natural and/or medicinal qualities of the garlic.

Accordingly, the present invention encompasses a flavor retaining, stabilized frozen garlic product, and process for producing the same, comprising garlic pulp, water and an emulsifying agent, the foregoing being mixed in the following relative quantities:

| | |
|---|---|
| garlic pulp | 60% – 80% by weight |
| natural emulsifying agent | 1% – 10% by weight |
| water | 1% – 10% by weight |

The natural emulsifying agent is preferably lecithin. The amount of garlic pulp, can be at least 80% and moreover, can exceed 80%; provided that lecithin comprises from 1% to 10% of the mixture so that the latter is dissolved therein and stabilizes the volatile oils of the raw garlic.

An example of a mixture of the above ingredients which has been found to form a stable emulsion capable of freezing is as follows:

Example I

| | |
|---|---|
| Raw, fresh crushed garlic (*allium sativium*) | 80% |
| Powdered garlic | 04% |
| Powdered lecithin | 06% |
| Water (from 1 to 10%) | 10% |

In the event a greater quantity of lecithin is added to the mixture than that specified above, the amount of powdered garlic would be accordingly reduced or eliminated altogether. The addition of powdered garlic is not essential to the mixture and is used pimarily for the addition of powdered substance to thicken the mixture if the lecithin employed is used in a minimal amount. Other forms of dry garlic could be used or further natural emulsifiers. The amounts of water and lecithin used can be varied as necessitated by the properties and species of the garlic used and depending on the concentration desired.

After the mixture forms an emulsion, freezing of the same is promptly effected.

What I claim is:

1. A flavor retaining stabilized frozen garlic product comprising garlic pulp, water and an emulsifying agent, said product containing 60 to 80% by weight of garlic pulp, 1 to 10% of a natural emulsifying agent, and 1 to 10% of water.

2. A flavor retaining stabilized frozen garlic product comprising garlic pulp, water and lecithin, said garlic product containing 60 to 80% by weight of garlic pulp, 1 to 10% of natural lecithin, and 1 to 10% of water.

3. A frozen garlic product comprising an emulsion of garlic pulp, water, and a natural emulsifying agent in an amount sufficient to form a stable product.

4. A method of making a frozen garlic product which comprises mixing at least 80% garlic pulp containing volatile oils therein, 10% water and 1–10% lecithin to effect the solution of the lecithin in the water and to stabilize the volatile oils in the garlic pulp, and freezing the same.

5. A method of preserving natural garlic, comprising the steps of
    comminuting the garlic cloves containing volatile oils therein;
    adding an emulsifying agent to the comminuted garlic cloves in an amount sufficient to form an emulsion wherein the volatile oils are stabilized; and
    freezing the emulsion.

6. A method according to claim 5 and further comprising the step of admixing water with the comminuted garlic cloves prior to the freezing step.

7. A method according to claim 5 wherein the step of adding an emulsifying agent comprises the step of adding lecithin.

* * * * *